(12) United States Patent
Morris

(10) Patent No.: US 11,718,010 B2
(45) Date of Patent: Aug. 8, 2023

(54) METHOD OF MAKING A WATER-SOLUBLE POLYMER COMPOSITION

(71) Applicant: PETER MORRIS RESEARCH AND DEVELOPMENT LIMITED, Tetbury (GB)

(72) Inventor: Peter Morris, Cirencester (GB)

(73) Assignee: PETER MORRIS RESEARCH AND DEVELOPMENT LIMITED, Tetbury (GB)

(*) Notice: Subject to any disclaimer, the term of this patent is extended or adjusted under 35 U.S.C. 154(b) by 250 days.

(21) Appl. No.: 16/882,794

(22) Filed: May 26, 2020

(65) Prior Publication Data

US 2021/0370571 A1 Dec. 2, 2021

(51) Int. Cl.

| | |
|---|---|
| B29B 9/06 | (2006.01) |
| B29C 48/14 | (2019.01) |
| B29C 48/355 | (2019.01) |
| B29C 48/76 | (2019.01) |
| C08K 3/26 | (2006.01) |
| C08K 5/20 | (2006.01) |
| C08K 3/16 | (2006.01) |
| B29K 101/00 | (2006.01) |

(52) U.S. Cl.
CPC ............ *B29C 48/1476* (2019.02); *B29B 9/06* (2013.01); *B29C 48/355* (2019.02); *B29C 48/767* (2019.02); *B29K 2101/00* (2013.01); *C08K 5/20* (2013.01); *C08K 2003/162* (2013.01); *C08K 2003/166* (2013.01); *C08K 2003/262* (2013.01)

(58) Field of Classification Search
CPC ............ B29C 48/1477; B29C 48/767; B29C 48/355; B29B 9/06; B29K 2101/00
USPC .................................................. 264/211.24
See application file for complete search history.

(56) References Cited

U.S. PATENT DOCUMENTS

| | | | |
|---|---|---|---|
| 2,858,345 | A | 10/1958 | Thomas et al. |
| 3,218,284 | A | 11/1965 | Gardner |
| 3,485,651 | A | 12/1969 | Ganz |
| 4,076,547 | A | 2/1978 | Lester et al. |
| 7,067,575 | B2 | 6/2006 | Kitamura et al. |
| 2009/0110942 | A1 | 4/2009 | Henderson-Rutgers et al. |
| 2009/0171264 | A1 | 7/2009 | King et al. |
| 2009/0286098 | A1* | 11/2009 | Yajima ............... C08J 7/046 264/1.6 |
| 2017/0369693 | A1 | 12/2017 | Morris |
| 2018/0245028 | A1 | 8/2018 | Ookubo et al. |
| 2020/0063076 | A1 | 2/2020 | Hiura |

FOREIGN PATENT DOCUMENTS

| | | |
|---|---|---|
| CN | 101962484 | 2/2011 |
| CN | 102532595 | 7/2012 |
| CN | 104151850 | 11/2014 |
| EP | 91311109.2 | 6/1992 |
| EP | 0860471 | 8/1998 |
| EP | 3348604 | 7/2018 |
| EP | 3348608 | 7/2018 |
| GB | 1077351 | 7/1967 |
| JP | 1970022627 | 7/1970 |
| JP | 03215588 | 2/1991 |
| JP | 04202535 | 7/1992 |
| JP | 06108042 | 4/1994 |
| JP | 2008239777 | 10/2008 |
| JP | 2012149144 | 8/2012 |
| JP | 2015214055 | 12/2015 |
| JP | 2015214651 | 12/2015 |
| JP | 2015214652 | 12/2015 |
| WO | 03076513 | 9/2003 |

OTHER PUBLICATIONS

Partial PCT International Search Report dated Aug. 24, 2021 for application No. PCT/GB2021/051124 filed May 11, 2021.
PCT International Search Report dated Nov. 19, 2021 for application No. PCT/GB2021/051124 filed May 11, 2021.
Search Report dated Mar. 10, 2014 for Application No. GB1400783.5.
International Search Report dated Jul. 1, 2014 for International Application No. PCT/GB2014/050846.
GB Examination Report dated Oct. 4, 2013 for GB Application No. GB1305380.6.
Search Report dated Jun. 21, 2013 for Application No. GB1305380.6.
GB Examination Report dated Dec. 2, 2013 for GB Application No. GB1305380.6.
Xue Huayu et al, Study on electrospinning of poly(vinyl alcohol)containing NaCl, Mar. 31, 2006, pp. 12-14.
Jiang Xian-Cai et al, Properties of Poly(vinyl alcohol) Plasticized by Magnesium Chloride, Aug. 31, 2012, pp. 1872-1876.
Chinese office action dated Jul. 28, 2016, for corresponding application No. 201480017279.2.
Office Action dated Nov. 16, 2016 for corresponding Australian application No. 2014242705 filed Mar. 25, 2013.
Office Action dated Nov. 24, 2017 for corresponding Japanese application No. 2016504735 filed Mar. 18, 2014.
Search Report dated Oct. 21, 2020 for Application No. GB2007826.7.

* cited by examiner

*Primary Examiner* — Jeffrey M Wollschlager
*Assistant Examiner* — Xue H Liu
(74) *Attorney, Agent, or Firm* — A.C. Entis-IP Ltd.; Allan C. Entis

(57) ABSTRACT

A method of creating a processable water soluble polymer, the method comprising the steps of: extruding a water soluble polymer composition from an extruder barrel without use of a die, wherein the extruder barrel is not vented other than via its extruder outlet, to produce an irregularly shaped polymer extrudate; directing the irregularly shaped polymer extrudate onto a chilled conveyor to cool the irregularly shaped polymer extrudate to below 60° C.; and granulating the irregularly shaped polymer extrudate to form a granulate.

13 Claims, No Drawings

METHOD OF MAKING A WATER-SOLUBLE POLYMER COMPOSITION

FIELD OF THE INVENTION

The present invention relates to a polymer composition, particularly but not exclusively to polyvinyl alcohol polymers, and to methods for their production.

BACKGROUND OF THE INVENTION

There is currently an increasing demand for water soluble, biodegradable polymers to replace the substantial amount of non-biodegradable polymers that are in the marketplace. Non-biodegradable polymers place a significant demand on resource due to the requirement for their disposal in landfill sites or by incineration.

Poly vinyl alcohol (PVA) is recognized as one of the very few vinyl polymers soluble in water that is also susceptible of ultimate biodegradation in the presence of suitably acclimated microorganisms. Accordingly, increasing attention is being devoted to the preparation of environmentally compatible PVA-based materials for a wide range of applications. PVA has excellent film and thin-walled container forming properties, demonstrating a high degree of impermeability to a number of gases, making it highly suitable for use in packaging products for release in an aqueous environment. It also has high adhesive strength, and is nontoxic. However, these properties are dependent on humidity due to the polymer absorbing water which reduces its tensile strength but increases its elongation and tear strength. It is also difficult to successfully extrude PVA or PVA-containing compositions which further limits its potential use. In particular, there are currently no formulations that can be readily moulded to a minimum thickness required (less than 200 microns) to ensure product release at low aqueous temperatures, typically at or below 5° C. in less than 2 minutes. Such a film is desirable for applications such as packaging of laundry products which require release of the laundry detergent at low temperatures and on a short wash cycle.

One of the properties of the polymer that it is desirable to improve is the Melt Flow Index. This relates to the ease of flow of the melt of the polymer, defined as the mass of the polymer, in grams, flowing in ten minutes through a capillary of a specific diameter and length by a pressure applied via prescribed alternative gravimetric weights for alternative prescribed temperatures. One such method is described in the standard ISO 1133. A higher MFI is required to provide a thin walled moulding.

It is known in the art to use internal lubricants within the PVA to increase its melt flow index. For example, EP1112316 B1 (PVAXX Technologies Limited) includes a fatty acid amide in an amount up to 5% by weight. The fatty acid provides lubrication between the polymer chains thereby increasing the melt flow of the polymer. However, they are insoluble, melting and coating the polymer during processing, which may impede dissolution of the polymer. Furthermore, the amount of lubricant that can be used is limited due to excess lubricant (generally above 5% by weight of the PVA) separating out of the blend, thereby restricting their ability to improve the MFI of a polymer.

The polymer is produced by polymerisation from vinyl acetate and subsequent hydrolysis of the polyvinyl acetate (PVAc) which is formed. PVA and PVA-derived polymers are soluble in water with their solubility being determined by the molecular weight of the polymer and the degree of hydrolysis, i.e. the percentage of acetate groups of the starting polymer (PVAc) that has been replaced with OH groups. The higher the degree, the lower the solubility and the speed of solution. The differences are much more marked at low dissolving temperatures than at high ones due to the formation of crystalline zones within the polymer.

It is also known in the art that PVA requires the removal of volatiles from the composition before melt processing as without such removal processing is difficult due to the formation of steam and subsequent foaming of the polymer. Drying is generally achieved using standard drying equipment at a temperature of 90° C. for a period of 4-9 hours, depending on make, model and formulation.

Despite attempts to mould articles from PVA or PVA derived compositions, the desired solubility characteristics have not been achieved due to the lack of melt flow required to mould a thin walled article that will dissolve in an aqueous solution within a desired time frame.

It is an aim of the present invention to provide water soluble polymer compositions, particularly but not exclusively polyvinyl alcohol compositions, that address or at least alleviate the aforementioned problems experienced with the polymer compositions of the prior art.

Further aims of the present invention are to provide methods for the production and extrusion and/or moulding of water soluble polymer compositions.

SUMMARY

According to the invention, there is provided a method of creating a water soluble polymer product, the method comprising the steps of: extruding a water soluble polymer composition from an extruder barrel without the use of a die, wherein the extruder barrel is not vented other than via its extruder outlet, to produce an irregular polymer extrudate; directing the irregular polymer extrudate onto a chilled conveyor to rapidly cool the irregular polymer extrudate below 60° C.; granulating the irregular polymer extrudate immediately following the chilled conveyor without a further drying step to form a granulate; and forming the granulate into a water soluble polymer product.

Preferably, the water soluble polymer composition may comprise a water soluble polymer with at least 15% by weight of the total weight of the composition of a hygroscopic salt to act as a lubricant to render the polymer extrudable and/or mouldable and with a solvent polymer plasticizer, wherein the solvent polymer plasticizer is mono-propylene glycol or di-propylene glycol, and wherein the water content of the composition is of less than 10% by weight of the total weight of the composition.

Preferably, the hygroscopic salt may be provided in a higher amount by weight than the solvent polymer plasticizer.

Preferably, the hygroscopic salt may be an anhydrous or hydrated salt selected from the group consisting of: sodium chloride, sodium citrate, magnesium chloride, calcium chloride, potassium chloride, sodium sulphate, sodium carbonate, potassium carbonate, and ammonium carbonate.

Preferably, the hygroscopic salt may be a water-soluble salt which will dissolve at a rate of at least 10% by weight in 90° C. water in ten minutes.

Preferably, the hygroscopic salt may have a water content of less than 10% by weight of the total weight of the composition.

Preferably, the hygroscopic salt may be included in an amount of at least 25% by weight of the total weight of the composition.

Preferably, the hygroscopic salt may be included in an amount of at least 30% by weight of the total weight of the composition.

Preferably, the hygroscopic salt may be in the anhydrous form.

Preferably, the water soluble polymer and hygroscopic salt may be provided in solid form.

Preferably, the polymer may comprise a polyvinyl alcohol polymer.

Preferably, the method may further comprise the step of extruding the water soluble polymer composition without using a die.

Preferably, the method may further comprise the step of extruding the water soluble polymer composition onto a chilled conveyor.

Preferably, the chilled conveyor may be at or below a temperature of between 10° C. and 30° C.

Preferably, the method may further comprise the step of granulating the water soluble polymer composition immediately following the chilled conveyor without a further drying step.

Preferably, the water soluble polymer may comprise a wax to improve humidity resistance Accordingly, the present invention provides a melt-processable water soluble polymer composition comprising a blend of a water soluble polymer with at least 15% by weight of the total weight of the composition of a hygroscopic salt to act as a lubricant to render the polymer extrudable and/or mouldable, wherein the composition has a water content of less than 10% by weight.

Preferably, there is provided at least 20% by weight of the total weight of the composition of the hygroscopic salt. Furthermore, the water soluble polymer may be solid at ambient temperature. More preferably, the polymer comprises a polyvinyl alcohol polymer. The PVA used in the present invention is not limited to any particular degree of hydrolysis. Partially or fully hydrolysed PVA may be used in the present invention. Similarly, the PVA is not limited to a particular molecular weight. The PVA may have a relatively low molecular weight of around 20,000 up to and beyond a molecular weight of 150,000.

The PVA preferably has a maximum water content of 5% by weight. It has been surprisingly found that the hygroscopic salt not only draws water from the PVA but also acts as an internal lubricant for the PVA increasing its Melt Flow Index.

Preferably, the hygroscopic salt is an anhydrous or hydrated salt selected from an alkaline or alkaline earth metal salt. Depending upon the end use of the composition, it may be beneficial to use a salt that is approved for food and/or pharmaceutical use and/or has other properties that may impart additional benefits in the end product, such as a water softener. More preferably, the salt is selected from the group consisting of sodium chloride, sodium citrate, magnesium chloride, calcium chloride, potassium chloride, sodium sulphate, sodium carbonate, potassium carbonate, and ammonium carbonate especially being sodium chloride or citrate.

A preferred embodiment of the first aspect of the invention comprises a blend of a water soluble polymer and an amount of sodium chloride effective to render the blend extrudable.

The salt has a water content of less than 10% by weight, preferably less than 1% by weight, more preferably less than 0.5% by weight, especially less than 0.2%. Ideally, the salt is in the anhydrous form. The salt may be micronized, for example the particles having a mean size of less than 100 microns, preferably being in the range 0.03-75 µm, especially 60-70 µm. The salt may also be coated to improve its properties, for example with sodium aluminosilicate, silicon dioxide and/or sodium hexacyanoferrate. One such example is sodium chloride salt coated with Sodium Aluminosilicate 0.5% (E554), Silicon Dioxide 0.75% (E551) and Sodium hexacyanoferrate (E535) as an anti-caking agent, available from Custom Powders (www.custompowders.co.uk).

The salt may be included in the composition in an amount up to 75% by weight of the total weight of the formulation. The salt is included in an amount of at least 15%, and preferably at least 20%, by weight of the total weight of the formulation, more preferably at least 25% by weight, more preferably at least 30% by weight, more preferably at least 35% by weight, more preferably at least 40% by weight, more preferably 45% by weight, and especially at least 50% by weight.

The composition may be compounded with optional additives to improve processability of the composition, such as plasticizers to enhance flexibility and/or lower the melt temperature of the polymer under extrusion or moulding, stabilizers to increase heat resistance and/or pigments to add colour. Preferably, thermal stabilizers, such as metal stearates, are included in an amount up to 0.5% by weight, preferably up to 0.3% by weight. However, the composition is preferably free from any fatty acid amides or esters.

In the first aspect of the present invention, the inbound water from other constituents within the composition surface, such as the polymer itself, treat the salt to enable it to act as an internal lubricant. An "internal" lubricant functions to improve lubrication between polymer chains. The use of a salt as a lubricant removes the need to use other types of prior art internal lubricant, such as fatty acid amides or esters.

An example composition without solvent plasticizer may be as follows:

| | |
|---|---|
| PVOH (80% hydrolyzed) | 69.7% |
| Sorbitol | 10.0% |
| NaCl | 20.0% |
| Thermal stabilizers | 0.3% |
| Total | 100% |

Melt Flow Index tested 190° C. using a 2.16 kg weight grams in 10 minutes=21.5

The sodium chloride is more readily soluble in water than the polymer, but is not a thermoplastic resin. Therefore, it would be expected that the angular crystalline structure of the salt would not mix with the polymer and would actually impede melt flow. Surprisingly, this is not found to be the case.

Preferably, the salt is provided in a higher percentage by weight than the solvent polymer plasticizer. More preferably, the ratio of salt to solvent polymer plasticizer is 1.25-12:1, especially 1.25-7:1, ideally 4-5:1.

Alternatively, the composition may include a solvent polymer plasticizer, preferably being a hygroscopic organic solvent, more preferably being selected from glycerine (also known as glycerin or glycerol) and propylene glycol. Preferably, the solvent polymer plasticizer is mono-propylene glycol, and in an even more preferable embodiment, the solvent polymer plasticizer is di-propylene glycol.

According to the invention, there is provided a melt-processable water soluble polymer composition comprising a blend of a water soluble polymer with at least 15% by weight of a hygroscopic salt to act as a lubricant to render the polymer extrudable and/or mouldable.

Another aspect of the present invention provides a soluble polymer internal lubricant comprising a blend of a hygroscopic salt and solvent polymer plasticizer of the salt.

The lubricant according to the present invention may be blended with a water soluble polymer for processing thereof. In this respect, a further aspect of the present invention provides a melt-processable water soluble polymer composition comprising a blend of a water soluble polymer with an internal lubricant to render the polymer extrudable and/or mouldable, the lubricant comprising a hygroscopic salt, preferably an anhydrous or hydrated metal salt, blended with a solvent polymer plasticizer. Preferably, the lubricant is in accordance with the third aspect of the invention.

It is preferable for the salt to have minimal water content, preferably the salt having a water content of less than 10% by weight, the salt comprising at least 15% by weight of the total weight of the formulation, more preferably at least 40% by weight, especially at least 50% by weight.

The lubricant according to the invention when mixed with the water soluble polymer preferably has a Melt Flow Index of at least 20 g (10 mins/190° C./2.16 kg, under ISO 1133), more preferably at least 40 g, especially 60 g.

The compositions of the present invention may be used in foodstuffs and/or pharmaceuticals. Therefore, it is to be appreciated that, if possible, the lubricant and other constituents of the composition have been approved for food and/or pharmaceutical use.

The composition according to the present invention may be provided in any suitable form for further processing but preferably is provided in the form of a powder, tablet or pellets for use in extrusion and/or moulding of an extruded and/or moulded product, such as an extruded filament, containing the soluble polymer. The composition may be manufactured by any conventional method, such as by melt compounding or cold processing, which in this latter case may include calendaring, adapted calendaring, and/or compaction. Cold pressing, and more preferably adapted calendaring, may be the technique of choice.

The compositions of the present invention may further include a plasticizer to lower the melt temperature of the polymer under extrusion and/or moulding. The plasticizer may be selected from the group consisting of glycerine, ethylene glycol, triethylene glycol, low molecular weight polyethylene glycols and low molecular weight amides. A preferred plasticizer is glycerine, and more preferably mono-propylene glycol or most preferably di-propylene glycol. The plasticizer may also function as the solvent polymer plasticizer of the salt internal lubricant.

A fifth aspect of the invention provides a method of making a water soluble polymer composition comprising blending a water soluble polymer with at least 15% by weight of the total weight of the composition of a hygroscopic salt to act as a lubricant to render the polymer extrudable and/or mouldable, wherein the water content of the composition is less than 10% by weight, the method optionally including adding a solvent polymer plasticizer.

A sixth aspect of the invention provides a method of extruding and/or moulding a water soluble polymer composition comprising softening a composition according to the first, second, third and/or fourth aspects of the present invention to form a melt flow. Preferably, heat and/or pressure soften the composition to create a melt flow.

The melt flow preferably has a Melt Flow Index of at least 20 g (10 mins/190° C./2.16 kg, under ISO 1133), more preferably at least 40 g, and especially 60 g. Preferably, the polymer composition is moulded into a form having a thickness of less than 200 microns, preferably less than 100 microns thereby enabling the form to dissolve within 80 seconds at 5° C. in aqueous solution. The moulded form may be any thin walled moulding, such as a container, or a film. Extrusion is also possible, although the composition of the present invention is especially beneficial for mouldings.

A seventh aspect of the invention provides for a water soluble polymer product formed in accordance with the sixth aspect of the invention.

An eighth aspect of the invention provides for a melt-processable water soluble polymer composition comprising: a blend of a water soluble polymer with a hygroscopic salt to act as a lubricant to render the polymer extrudable and/or mouldable, a solvent polymer plasticizer; and a wax, wherein the wax content of the composition is at least 0.3% by weight of the total weight of the composition; wherein the water content of the composition is of less than 10% by weight of the total weight of the composition; and the hygroscopic salt is included in the composition in an amount of at least 15% by weight of the total weight of the composition.

Preferably, the melt-processable water soluble polymer composition may have a wax content of at least 1.0% by weight of the total weight of the composition.

Preferably, the wax may be glycerol mono stearate.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

The melt-processable compositions of the present invention may be processed by any known thermoprocessing method, including but not limited to, injection moulding, compression moulding, rotational moulding and film extrusion. The compositions are particularly suitable for thin-walled mouldings.

The melt-processable compositions of the invention are suitable for the manufacture of any article currently made from extrudable and/or mouldable polymers, including films, containers and bottles. The compositions are suited to the manufacture of filaments and fibre, for use in spunbond, non-woven and melt-blowing applications. The composition is suitable also for manufacture of such articles as detergent and agro chemical sachets and containers, mulch films, plant pots, domestic bags, diapers, drinking straws, fem care products, hangers, incontinence pads, sachets, six pack rings, disposable clothing, expanded foams, gloves, film canisters, golf tees, shot gun cartridges, bed pans, bottles, bowls, cotton buds, hospital curtains, "one-use" sterile products and packaging materials.

PVA generally has moisture content up to 5% by weight. This has to be reduced to below 1% to avoid processing issues on standard thermoplastic equipment, such as the generation of volatiles which causes foaming. Conventionally, the polymer is dried in a standard polymer dryer for 4-8 hours at 90° C. It has been found that the addition of a hygroscopic salt in a particular amount, preferably having a low water content or being anhydrous, removes water from the surrounding PVA. More surprisingly, the absorption of water by the salt provides a self-lubricating coating on the salt which is then able to act as an internal lubricant for the PVA. The desiccant effect of the salt reduces drying time to 2-4 hours enabling a substantial energy saving in the polymer production and furthermore, the lubrication brought about by the salt greatly increases the Melt Flow Index of composition such that the PVA may be readily extruded and/or moulded into products and, in particular to thin forms of less than 200 microns making it suitable for applications where dissolution of the film and/or moulding is required at temperatures as low as 5° C. within a short time period (under 2 minutes). The self-lubricating effect is still active at low moisture levels of less than 1%, i.e. even during the drying process. It is feasible that the temperature may be decreased further and therefore closer to 0° C., and the time may also be decreased.

The hygroscopic salt, such as sodium chloride, has been found to have an enhanced lubricating effect if polymer plasticizers are included in the composition, such as hygroscopic salt solvents including glycerine or propylene glycol, and particularly—propylene glycol or most preferably di-propylene glycol. Absorption of water by the salt appears to act as a surface treatment enabling non solvent plasticizers to be used in the formulation, if desired. Anhydrous salts would not normally be considered as suitable for internal lubrication of water soluble polymers. In this respect, precipitated calcium carbonate (PCC) has been used in small amounts (2-3%). Alcohol plasticizers are not solvents of PCC so high loadings have to be used to produce high melt flow resulting in very ductile products as the PVA becomes encapsulated around the PCC particles. Melt flow indexes are also disappointing. In comparison, the present invention uses glycerine, mono-propylene glycol, or di-propylene glycol, which are solvents of anhydrous sodium chloride, to partially dissolve the outer surface of the sodium chloride to provide a lubricant within the polymer chains. This produces a comparatively high MFI and increases the solubility of the polymer, whilst decreasing its ductility (a desirable trait).

Sodium chloride is one possible hygroscopic salt which can be used here. Sodium citrate and magnesium chloride are other possible alternatives, as are calcium chloride, potassium chloride, sodium sulphate, sodium carbonate, potassium carbonate, and ammonium carbonate. The requisite characteristics of the hygroscopic salt for the present invention are that the hygroscopic salt is water-soluble, having the ability to absorb atmospheric water, and/or which will achieve a dissolution rate of at least 10% by weight in 90° C. water in 10 minutes.

It is to be appreciated that including high levels of water in the composition (either as a plasticizer or binder) even with a hygroscopic salt would not achieve the benefits of the present invention. The water would result in reversible dissolution of some or all of the salt present. Furthermore, reduction of the water content for successful processing would result in removal of the self-lubricating layer and the reformation of salt crystals of unpredictable size and shape. This hampers melt flow and would add to the drying time. Thus, it is a preference of the present invention that water is not added to the formulation beyond the low water content contained in the various constituents, such as the PVA, making up the composition.

The present invention will now be described with reference to the following non-limiting examples. The examples illustrate the high melt flow values achieved with the compositions according to the present invention, their reduced drying times and compare these properties with compositions falling outside the scope of protection.

Method of Production

PVA (polymer), sodium chloride (lubricant), glycerin (plasticizer) and thermal plasticizers were mixed in a bell tub, low-shear mixer for 3 minutes. The mix was then fed into a compounder via a screw and formed into pellets via an adapted calendaring process. The adapted calendaring process causes partial or complete melting of the PVA as a result of frictional shear as it is passed between the roller and die, causing agglomeration before extrusion through the die. The temperature of the pre-extrudate varied from 110° C. to 140° C. and the formed pellets were then placed in a tray polymer dryer for 3 hours at 90° C.

Melt Flow Analysis 5 gram samples of the formulations prepared according to the invention were tested for MFI at 190° C. using a 2.16 kg weight. Each sample was tested and compared for MFI according to ISO 1133. The test was repeated by a factor of 10 and the mean result was recorded.

The samples were moulded using a 50 tonne moulding press in automatic mode with a cycle time of 7-10 seconds using a mould with a hot runner system at 180° C. to 200° C. The screw temperature profile (in ° C.) from the hopper to tip was 160, 170, 180, 180-190. The part wall section was measured between 600-350 microns.

Example 1

Formulations were made according to the method above having the ingredients shown in Table 1 below mixed in the given percentage by weight. 88% hydrolysed PVA was used in each formulation and the thermal stabiliser was calcium stearate. The Melt Flow Index (MFI) was determined according to the analysis given above.

TABLE 1

| Formulation | PVA (% by weight) | Glycerin (% by weight) | NaCl (% by weight) | Thermal stabilizers (% by weight) | Ratio of salt:glycerin | MFI/g 10 minutes |
|---|---|---|---|---|---|---|
| 1 | 84.7 | 10.0 | 5.0 | 0.3 | 0.5:1 | 7.0 |
| 2 | 39.7 | 8.0 | 52.0 | 0.3 | 6.5:1 | 44.0 |
| 3 | 38.7 | 10.0 | 51.0 | 0.3 | 5.1:1 | 56.0 |
| 4 | 36.7 | 12.0 | 51.0 | 0.3 | 4.25:1 | 77.0 |
| 5 | 25.7 | 14.0 | 60.0 | 0.3 | 4.28:1 | 78.0 |

Formulation 2 shown in Table 1 above was found to have a white/cream colour with the following properties:

| Density | 1.68 g/cm |
|---|---|
| Melt density | 1.52 g/cm at 200° C. (under ISO 1183). |

These results illustrate the importance of having a high ratio of salt to plasticizer in the formulation to achieve the desired high MFI but that peak MFI values are obtained in the above formulations where the salt to plasticizer ratio is 3.5-5:1, more preferably 4-4.4:1.

Example 2

Formulations were made according to the method above having the ingredients shown in Table 2 below mixed in the given percents by weight. 88% hydrolysed PVA was used in each formulation. The Melt Flow Index (MFI) was determined according to the analysis given above. The part wall section of the moulded formulations was measured from 600 microns to 100 microns.

TABLE 2

| Formulation | PVA (% by weight) | Propylene glycol (% by weight) | NaCl (% by weight) | Thermal stabilizers (% by weight) | Ratio of salt:propylene glycol | MFI/g |
|---|---|---|---|---|---|---|
| 6 | 84.7 | 10.0 | 5.0 | 0.3 | 0.5:1 | 9.0 |
| 7 | 39.7 | 8.0 | 52.0 | 0.3 | 6.5:1 | 40.0 |
| 8 | 36.7 | 10.0 | 51.0 | 0.3 | 5.1:1 | 51.0 |
| 9 | 38.7 | 12.0 | 51.0 | 0.3 | 4.25:1 | 75.0 |

Table 2 demonstrates that the type of plasticizer does not have a significant effect on the MFI achieved.

Example 3

Formulations were made according to the method above having the ingredients mixed in the percent by weights shown in Table 3 below. 98% hydrolysed PVA was used in formulation 10-13 and 80% hydrolysed PVA was used in formulations 14-16. The formulations were moulded using a Boy 50 tonne moulding process in automatic mode with a cycle time of 20 seconds using a mould with a cold runner system. The screw temperature profile (in ° C.) from the hopper to tip was 160, 170, 180, 180, 220. The part wall section was measured from 600 to 2000 microns.

TABLE 3

| Formulation | PVA (% by weight) | Glycerin (% by weight) | NaCl (% by weight) | Thermal stabilizers (% by weight) | Ratio of salt:glycerin | MFI/g |
|---|---|---|---|---|---|---|
| 10 | 89.0 | 10.0 | 0.0 | 0.3 | 0:1 | 1.9 |
| 11 | 84.5 | 9.5 | 5.0 | 0.3 | 0.52:1 | 3.48 |
| 12 | 80.1 | 9.0 | 10.0 | 0.3 | 1.1:1 | 2.75 |
| 13 | 67.2 | 7.5 | 25.0 | 0.3 | 3.33:1 | 1.91 |
| 14 | 20.0 | 15.7 | 64.0 | 0.3 | 4:1 | 73.5 |
| 15 | 15.0 | 11.7 | 73.0 | 0.3 | 6:1 | 1.9 |
| 16 | 12.0 | 9.3 | 78.4 | 0.3 | 8:1 | 0.00 |

Example 4

Formulation 17 was prepared as a blend in a similar way to Formulation 2 of Example 1 but having sodium citrate in place of sodium chloride, as follows:

| | |
|---|---|
| PVA (88% hydrolysed) | 39.0% by wt. |
| Sodium citrate | 51.0% by wt. |
| Glycerol | 9.70% by wt. |
| Calcium stearate | 0.3% by wt. |

This formulation was found to have the following properties:

| | |
|---|---|
| Density | 1.67 g/cm |
| Melt density | 1.40-1.42 g/cm at 190° C. (under ISO 1183) |
| MFI | 38 g. |

Processing temperature was 190-200° C. with a residence time of up to 30 minutes. Drying time was 4 hours at 90° C. The MFI is again substantially higher with the salt included in the composition.

This formulation and that of Formulation 2 were examined for their extrudability in injection moulding machines made by Boy, Demag and Arburg. Extrusion processing was carried out using a single full flight screw with constant pitch. The barrel temperature had a profile of 160-200° C. and the screw speed varied typically between 20-150 rpm. Shut down of the apparatus was carried out by maintaining the temperature at 100° C. with screw rotation stopped. Complete shutdown was then carried out by switching off the machine.

Formulations 2 and 17 were capable of being moulded into a range of containers of various sizes and colours and were suitable for injection moulding. The use of sodium citrate as the polymer lubricant provides additional advantages if it is used for packaging laundry products as it acts as a water softener.

Example 5

A study was carried out to investigate the requirement to have a low water content in the formulations of the present invention.

Table 4 below sets out the composition of the formulations, together with their MFI and drying time.

TABLE 4

| Formulation | PVA (% by weight) | Glycerin (% by weight) | NaCl (% by weight) | Thermal Stabilizers (% by weight) | Water (% by weight) | Moisture content pre-drying | Moisture content post drying | Drying time/hr at 90° C. | MFI/g |
|---|---|---|---|---|---|---|---|---|---|
| A | 73.0 | 11.7 | 15.0 | 0.3 | 0.00 | 2.4 | 0.9 | 5.0 | 22.0 |
| B | 37.0 | 11.7 | 51.0 | 0.3 | 0.00 | 2.0 | 0.9 | 3.0 | 77.0 |
| C | 71.3 | 10.2 | 5.2 | 0.3 | 13.0 | 24 | 0.9 | 9.0 | 10.0 |
| D | 60.5 | 9.7 | 12.5 | 0.3 | 17.0 | 23 | 0.9 | 13.0 | 7.0 |

Table 4 clearly shows the importance of the amount of salt and water contained within the formulation on drying time and on MFI. The formulation has a higher percentage of salt (of at least 15%, preferably at least 20%, and more preferably at least 40%) with minimal or no water content. Formulations C and D which contained 13 and 17% water respectively were very sticky formulations that were not free-flowing making them unsuitable for compounding. Additionally, the excess drying times resulted in undesirable glycerine vapour loss.

Example 6

The ratio (typically expressed as a percentage) of partial pressure for water vapor in a given environment compared to the equilibrium vapor pressure of pure water is known as relative humidity (RH). The RH at which a given material begins to deliquesce, that is, when water adsorbed onto the material starts to solvate molecules of the material, is termed the material's deliquescence point ($RH_O$; also referred to in the art as "critical RH"), and is an important parameter characterizing structural stability of a polymer material. The $RH_O$ is temperature-dependent and is typically expressed as a $RH_O$ value at a given temperature. By way of example, the $RH_O$ of crystalline NaCl at 20 degrees Celsius (deg. C.) is approximately 77% RH—that is, when ambient temperature is at 20 deg. C., water vapor from the atmosphere will spontaneously be adsorbed onto and solvate NaCl crystals when ambient RH is at or above 77%.

A material with a low $RH_O$ value tends to absorb moisture more readily and may serve well as desiccants. By contrast, a material with a high $RH_O$ tends to absorb moisture less readily. In the case of polymer compositions, having a higher $RH_O$ advantageously reduces requirements for secondary packaging, and provides a more structurally stable product when opened to an unprotected environment.

One issue with products comprising water soluble polymers is that they tend to be hygroscopic and structurally unstable in environments with a high RH. By way of example, at an ambient temperature of 20 deg. C., PVA begins to deliquesce when RH reaches above 50%.

One issue found with formulations comprising PVA, sodium chloride and glycerine as outlined above is that, although the lubricating effect of the glycerine and salt combination aids melt processing, the resultant mouldings are susceptible to moisture uptake, and secondary packaging is required with high moisture- and gas-barrier properties.

Various water-soluble polymer compositions comprising 88% hydrolyzed Polyvinyl alcohol (PVA) and NaCl were produced using one of three different solvent polymer plasticizers: glycerine, mono-propylene glycol and di-propylene glycol. Table 5, provided herein below, shows the formulation of nine different formulations, formulas 1-3 with glycerine, formulas 4-6 with mono-propylene glycol and formulas 7-9 with di-propylene glycol:

TABLE 5

| PVA hydrolysis (%) | PVA (% by weight) | Di-Propylene Glycol (% by weight) | Mono-Propylene Glycol (% by weight) | Glycerine (% by weight) | NaCl (% by weight) | Deliquescent Point ($RH_O$ at 20° C.) |
|---|---|---|---|---|---|---|
| 88.0 | 74.0 | 8.0 | | | 15.0 | 83% |
| 88.0 | 62.0 | 10.0 | | | 25.0 | 82% |
| 88.0 | 37.0 | 10.0 | | | 50.0 | 80% |
| 88.0 | 74.0 | | 8.0 | | 15.0 | 77% |
| 88.0 | 62.0 | | 10.0 | | 25.0 | 77% |
| 88.0 | 37.0 | | 10.0 | | 50.0 | 76% |
| 88.0 | 74.0 | | | 8.0 | 15.0 | 66% |
| 88.0 | 62.0 | | | 10.0 | 25.0 | 66% |
| 88.0 | 37.0 | | | 10.0 | 50.0 | 62% |

As shown in Table 5, it was found that using propylene glycol as the solvent polymer plasticizer surprisingly resulted in a less water-absorbent and thus more stable PVA-based polymer product relative to comparable formulations using glycerine as the solvent polymer plasticizer. Whereas formulations 7-9 with glycerine demonstrated an $RH_O$ at 20 deg. C. of 62% to 66%, all formulations with propylene glycol had a substantially higher $RH_O$ at 20 deg. C., between 76% and 83%.

Moreover, formulations with di-propylene glycol were found to be even more stable than comparable formulations with mono-propylene glycol: formulations 1-3 with di-propylene glycol had an $RH_O$ at 20 deg. C. of 80% to 83%, whereas formulations 4-6 with mono-propylene glycol had a lower $RH_O$ at 20 deg. C. of 76% to 77%.

Example 7

Formulations involving di-propylene glycol and sodium chloride were made to compare melt-flow indexes.

TABLE 6

| PVA hydrolysis (%) | PVA (% by weight) | Di-Propylene Glycol (% by weight) | NaCl (% by weight) | MFI/g 10 minutes |
| --- | --- | --- | --- | --- |
| 88.0 | 74.0 | 8.0 | 15.0 | 10.0 |
| 88.0 | 69.0 | 8.0 | 20.0 | 19.0 |
| 88.0 | 64.0 | 8.0 | 25.0 | 20.0 |
| 88.0 | 57.0 | 10.0 | 30.0 | 33.0 |
| 88.0 | 52.0 | 10.0 | 35.0 | 33.0 |
| 88.0 | 47.0 | 10.0 | 50.0 | 34.0 |
| 88.0 | 42.0 | 10.0 | 45.0 | 40.0 |
| 88.0 | 45.0 | 12.0 | 50.0 | 44.0 |

Appreciable improvements in melt-flow index are demonstrated as the hygroscopic salt concentration increases.

Further Method of Production

Traditionally in the art, extrusion is achieved via a slot die or strand die to manufacture PVA resin. Both the slot die and strand die provide sufficient back-pressure to create an even flow of polymer melt from the extruder to where the extrudate must be cooled. This is typically performed by water immersion or by cooling with ambient or chilled air.

The problem with water immersion is that the PVA is water-soluble, and therefore further drying would be required post-immersion.

When cooling with ambient air, the issue is the loss of plasticizer from the formulation until the extrudate is cooled below 60° C.

PVA blended with lubricating hygroscopic salts, as formed according to the present method is more soluble and more brittle, and therefore unsuited for strand extrusion and water cooling. When cooled in water, the pellets become slimy due to dissolution, sticking together and therefore further drying is required. Strands will also become brittle due to the reduced polymer and high salt content, as well as loss of plasticizer by up to 0.75% during air cooling. The process is not stable due to strand breakage and loss of material, resulting in process down-time. The volatile loss of plasticizer also leads to inconsistent product results, dependent on the ambient conditions and time taken to cool. Melt-flow indexes can vary greatly Slot dies produce a tape for extrusion, and does not form a pellet for reprocessing.

Air cooling is preferred when compared to a traditional water bath as described. It is, however, possible to cool the extrudate with fan-assisted air supported on a moving conveyor. The extrudate strand leaves the strand die at 165° C. to 200° C. and reaches a stand pelletizer at a maximum temperature of 60° C. The plasticizer evaporation described above occurs on this moving conveyor. This reduction in mass results in financial loss, in addition to having an adverse effect on the melt-flow index.

A new method of cooling of the extrudate has therefore been developed to cope with the improved polymer composition. For convenience of presentation, the new method may be referred to as a "chilled roller method".

In the chilled roller method, the polymer is extruded without additional venting in the barrel, and without a slot or strand die. With no back-pressure, the barrel vents steam and produces an extrudate which is (1) irregular and inconsistent in size and shape, and (2) very low in water content, preferably below 1% (v/v). This is a significant difference to a conventional process in which the polymer is extruded into a slot or strand die. Slot or strand die methods require the extrudate to have a regular and consistent size and shape to remain operational, and since the presence of steam in the barrel causes the irregularities, the additional venting to the barrel must be provided for slot or strand die methods.

Irregular extrudate is permitted to fall onto a chilled roller or conveyor, where the temperature chills the extrudate quickly to below 100° C. but above 10° C., and preferably below 60° C. The chilling process is near instantaneous, occurring in less than 30 s, more preferably less than 20 s, even more preferably less than 10 s, and generally in less than 5 s. The chilled rollers are set to obtain instant cooling, to thereby avoid plasticizer loss. In practice, if the extrudate were to cool slightly before chilling in an instantaneous manner, it would no longer be sufficiently malleable to pass through the chilled rollers. Immediate passage must be made to maintain sufficient malleability for rolling. The irregular extrudate, once chilled, was directed into a commercial polymer grinder to be made into granules, which can be stored for onward processing, typically via encapsulation into hermetically sealed vacuum bags.

Adapted calendaring with, preferably water-chilled, chilled rollers to accommodate an inconsistent extrudate permits fast cooling of the extrudate to 60° C. and below. Additionally, the high heat transfer properties of PVA with at least 15% by weight of hygroscopic salts results in further improved cooling via this system.

If no salt were used in the formulation, lower temperature rollers would be required, that is, below 10° C. to obtain the same cooling rate to prevent loss of plasticizer. This can cause condensation onto the chilled rollers which can cause process issues and extrudate sticking to the rollers. This renders the process ineffective. Water temperature of between 10° C. and 30° C. has been found to be most efficient for PVA and salt compositions, whereas below 10° C. is required for saltless compositions, though the condensation proves to be an issue here.

Below 60° C., plasticizer becomes locked into the polymer composition, being below the plasticizer evaporation temperature, preventing losses of the total weight of the polymer composition in the range of 0.75% to 1.25% due to evaporation. The resulting polymer also has a very low water content, as most of the water present is lost during the extrusion process as steam. Water content can then be maintained below 1% by weight which is the maximum possible water content required for successful reprocessing of the irregular extrudate. This also removes the need for a further polymer drying step.

A comparison between examples products of embodiments of the chilled roller method described herein above with a conventional chilled air stand line process, that is, the process in which regular extrudate is extrudate directly into a strand for air cooling, is outlined in Tables 7 and 8 below.

TABLE 7

Chilled Roller Method

| PVA hydrolysis (%) | PVA (% by weight) | Di-Propylene Glycol (% by weight) | NaCl (% by weight) | MFI/g 10 minutes | Extrudate Temperature at Extruder (° C.) | Extrudate Temperature at Granulator (° C.) |
|---|---|---|---|---|---|---|
| 88.0 | 59.0 | 8.0 | 30.0 | 17.0 | 190 | 59 |
| 88.0 | 58.0 | 9.0 | 30.0 | 20.0 | 200 | 60 |
| 88.0 | 57.0 | 10.0 | 30.0 | 23.0 | 185 | 57 |

TABLE 8

Extruder and Stand Line

| PVA hydrolysis (%) | PVA (% by weight) | Di-Propylene Glycol (% by weight) | NaCl (% by weight) | MFI/g 10 minutes | Extrudate Temperature at Extruder (° C.) | Extrudate Temperature at Pelletiser (° C.) |
|---|---|---|---|---|---|---|
| 88.0 | 59.0 | 8.0 | 30.0 | 14.0 | 190 | 60 |
| 88.0 | 58.0 | 9.0 | 30.0 | 17.0 | 200 | 65 |
| 88.0 | 57.0 | 10.0 | 30.0 | 21.0 | 185 | 62 |

As can be seen, the chilled roller method results in an extrudate which has a higher melt-flow index under otherwise identical conditions. In addition, extrudate temperature is consistently lower at the point of reaching the granulator in embodiments of the chilled roller method, thus reducing plasticizer evaporation.

The irregular extrudate, once chilled, can then be directed into a commercial polymer grinder or granulator, and the polymer ground until the particulate matter falls through a sieve plate to determine maximum particulate size. The irregularity of the extrudate however creates a variable polymer grain size, typically in the range of 2 mm to 4 mm.

Surprisingly, this non-uniformity of particular size aids polymer melt during subsequent reprocessing. As such, the combination of the chilled roller method is highly suited towards use with a granulator. Smaller particles melt more quickly, requiring less energy, with an observable 10° C. reduction in barrel zone temperatures when compared with a strand die pellet process. Lower processing temperatures also result in lower plasticizer loss rates, which might otherwise turn to gas and cause gassing during reprocessing, usually via injection molding or extrusion. Gassing can lead to burn marks on molding, and part rejection and mold contamination during processing, so reduction in gassing is a noticeable improvement.

Vegetable wax is typically used to impart humidity resistance to a polymer. Typically, 0.3% to 1.0% of glycerol mono stearate or a stearamide would be used as the vegetable was. However, usage of vegetable wax during the melt process also has a disadvantageous effect of inducing "screw slip". Screw slip is a situation when, during the melt process, the extruder machine or injection moulder is unable to convey molten material due to slipperiness of the polymer melt, with the vegetable wax coating the barrel as a lubricant.

For PVA having no salt included, 0.3% wax content would typically be the maximum permissible amount due to screw slippage, though with small amounts of salts, higher wax content, up to 2% to 3% can be provided. The addition of these vegetable waxes decreases water absorption of PVOH formulations with mono and di propylene glycol by as much as 50% when compared with formulations without salts.

Surprisingly, irregularity of the particulate shape also advantageously results in a reduction of screw slip when formulating the polymer composition including amounts of vegetable wax that would typically be expected to results in screw slip.

The irregular size and shape of the granules prior to melt forms a mixture more gradually in the present invention, allowing for better adhesion during polymer transfer via the screw. This allows for a larger wax component to be added.

The compositions of the present invention thus provide a melt-processable PVA containing polymer typically having a flexural modulus similar to other extrudable polymers. This enables a soluble and biodegradable polymer to be used for the processing of a wide variety of articles without the processing problems experienced in the prior art, such as thermal degradation and high temperature cross-linking. The known advantageous properties of PVA, such as its high tensile strength and good barrier characteristics, are retained in the melt-processable composition, which may be extruded on current extrusion lines, blow-moulders and injection moulders without modification.

There is therefore provided a method of creating a processable water soluble polymer, the method comprising the steps of: extruding a water soluble polymer composition from an extruder barrel without use of a die, wherein the extruder barrel is not vented other than via its extruder outlet, to produce an irregularly shaped polymer extrudate; directing the irregularly shaped polymer extrudate onto a chilled conveyor to cool the irregularly shaped polymer extrudate to below 60° C.; and granulating the irregularly shaped polymer extrudate to form a granulate.

Optionally, the granulation of the irregularly shaped polymer extrudate occurs immediately following the chilled conveyor without a further drying step.

Optionally, the method further comprises the step of forming the granulate into a water soluble polymer product.

Optionally, the water soluble polymer composition comprises a water soluble polymer with at least 15% by weight of the total weight of the composition of a hygroscopic salt to act as a lubricant to render the polymer extrudable and/or mouldable and with a solvent polymer plasticizer, wherein the solvent polymer plasticizer is mono-propylene glycol or di-propylene glycol, and wherein the water content of the composition is of less than 10% by weight of the total weight of the composition. Optionally, the hygroscopic salt is provided in a higher amount by weight than the solvent polymer plasticizer. Optionally, the hygroscopic salt is an anhydrous or hydrated salt selected from the group consisting of: sodium chloride, sodium citrate, magnesium chloride, calcium chloride, potassium chloride, sodium sulphate, sodium carbonate, potassium carbonate, and ammonium carbonate. Optionally, the hygroscopic salt is a water-soluble salt which will dissolve at a rate of at least 10% by weight in 90° C. water in ten minutes.

Optionally, the hygroscopic salt has a water content of less than 10% by weight of the total weight of the composition. Optionally, the hygroscopic salt is included in an amount of at least 25% by weight of the total weight of the composition. Optionally, the hygroscopic salt is included in an amount of at least 30% by weight of the total weight of the composition.

Optionally, the water soluble polymer and hygroscopic salt are provided in solid form.

Optionally, the method further comprises the step of extruding the water soluble polymer composition without using a die.

Optionally, the method further the step of extruding the water soluble polymer composition onto a chilled conveyor. Optionally, the chilled conveyor is at or below a temperature of between 10° C. and 30° C. Optionally, the method further comprises the step of granulating the water soluble polymer composition immediately following the chilled conveyor without a further drying step.

Optionally, the water soluble polymer comprises a wax to improve humidity resistance.

There is also provided in accordance with an embodiment of the disclosure a water soluble polymer product formed in accordance with the method described herein above.

There is also provided in accordance with an embodiment of the disclosure a melt-processable water soluble polymer composition comprising: a blend of a water soluble polymer with a hygroscopic salt to act as a lubricant to render the polymer extrudable and/or mouldable, a solvent polymer plasticizer; and a wax, wherein the wax content of the composition is at least 0.3% by weight of the total weight of the composition; wherein the water content of the composition is of less than 10% by weight of the total weight of the composition; and the hygroscopic salt is included in the composition in an amount of at least 15% by weight of the total weight of the composition.

Optionally, the wax content is at least 1.0% by weight of the total weight of the composition.

Optionally, the wax is glycerol mono stearate or a stearamide.

In the description and claims of the present application, each of the verbs, "comprise," "include" and "have," and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. A method of creating a processable water soluble polymer, the method comprising the steps of:
   extruding a water soluble polymer composition from an extruder barrel without use of a die, wherein the extruder barrel is not vented other than via its extruder outlet, to vent steam through the extruder outlet only and thereby produce an irregularly shaped polymer extrudate;
   directing the irregularly shaped polymer extrudate onto a chilled conveyor to cool the irregularly shaped polymer extrudate to below 60° C.; and
   granulating the irregularly shaped polymer extrudate to form a granulate
   wherein the polymer comprises a polyvinyl alcohol polymer.

2. A method according to claim 1, wherein the granulation of the irregularly shaped polymer extrudate occurs immediately following the chilled conveyor without a further drying step.

3. A method according to claim 1, further comprising the step of forming the granulate into a water soluble polymer product.

4. A method according to claim 1, wherein the water soluble polymer composition comprises a water soluble polymer with at least 15% by weight of the total weight of the composition of a hygroscopic salt to act as a lubricant to render the polymer extrudable and/or mouldable and with a solvent polymer plasticizer, wherein the solvent polymer plasticizer is mono-propylene glycol or di-propylene glycol, and wherein the water content of the composition is of less than 10% by weight of the total weight of the composition.

5. A method according to claim 4, wherein the hygroscopic salt is provided in a higher amount by weight than the solvent polymer plasticizer.

6. A method according to claim 4, wherein the hygroscopic salt is an anhydrous or hydrated salt selected from the group consisting of: sodium chloride, sodium citrate, magnesium chloride, calcium chloride, potassium chloride, sodium sulphate, sodium carbonate, potassium carbonate, and ammonium carbonate.

7. A method according to claim 4, wherein the hygroscopic salt is a water-soluble salt which will dissolve at a rate of at least 10% by weight in 90° C. water in ten minutes.

8. A method according to claim 4, wherein the hygroscopic salt has a water content of less than 10% by weight of the total weight of the composition.

9. A method according to claim 8, wherein the hygroscopic salt is included in an amount of at least 25% by weight of the total weight of the composition.

10. A method according to claim 9, wherein the hygroscopic salt is included in an amount of at least 30% by weight of the total weight of the composition.

11. A method according to claim 4, wherein the water soluble polymer and hygroscopic salt are provided in solid form.

12. A method according to claim 1, wherein the chilled conveyor is at or below a temperature of between 10° C. and 30° C.

13. A method as claimed in claim 1, wherein the water soluble polymer comprises a wax to improve humidity resistance.

* * * * *